US009058197B2

(12) United States Patent
Li et al.

(10) Patent No.: US 9,058,197 B2
(45) Date of Patent: Jun. 16, 2015

(54) METHOD FOR SHARING MEMORY OF VIRTUAL MACHINE AND COMPUTER SYSTEM USING THE SAME

(75) Inventors: Han-Lin Li, Taoyuan County (TW); Jui-Hao Chiang, Taipei (TW); Tzi-Cker Chiueh, Taipei (TW); Ying-Shiuan Pan, Kaohsiung (TW); Po-Jui Tsao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 159 days.

(21) Appl. No.: 13/363,365

(22) Filed: Jan. 31, 2012

(65) Prior Publication Data

US 2013/0097358 A1 Apr. 18, 2013

Related U.S. Application Data

(60) Provisional application No. 61/548,697, filed on Oct. 18, 2011.

(30) Foreign Application Priority Data

Dec. 7, 2011 (TW) .............................. 100145074 A

(51) Int. Cl.
*G06F 12/08* (2006.01)
*G06F 9/455* (2006.01)

(52) U.S. Cl.
CPC .. *G06F 9/45558* (2013.01); *G06F 2009/45583* (2013.01)

(58) Field of Classification Search
CPC ............ G06F 9/45558; G06F 12/1009; G06F 2009/45583; G06F 2212/151; G06F 12/1027; G06F 12/10; G06F 12/08; G06F 12/023; G06F 12/1475; G06F 2212/657
USPC ........................ 711/6, 147, 202, 206, E12.016
See application file for complete search history.

(56) References Cited

U.S. PATENT DOCUMENTS 6,789,156 B1  9/2004 Waldspurger
7,500,048 B1  3/2009 Venkitachalam et al.
(Continued)

FOREIGN PATENT DOCUMENTS

CN      101158924      4/2008

OTHER PUBLICATIONS

Arcangeli et al., "Increasing memory density by using KSM", Proceedings of the Linux Symposium, Jul. 2009, Montreal, Quebec, Canada, Red Hat, Inc.
Kloster et al., "On the Feasibility of Memory Sharing: Content-Based Page Sharing in the Xen Virtual Machine Monitor", Jun. 2006, Department of Computer Science, Aalborg University.
(Continued)

*Primary Examiner* — Jasmine Song
(74) *Attorney, Agent, or Firm* — Jianq Chyun IP Office

(57) ABSTRACT

A method for sharing memories of virtual machines is provided. The method is applied for a computer system configured to execute at least one virtual machine. The method includes the following steps. A memory map corresponding to the virtual machines is obtained, wherein usage states of memory pages of the virtual machine are stored in the corresponding memory map. Unused memory pages of the virtual machines are marked as free pages according to the corresponding memory map. The free pages of the virtual machines are shared. Therefore, the unused memory pages in the virtual machine can be shared. A computer system using the foregoing method is also provided.

16 Claims, 8 Drawing Sheets

(56) References Cited

U.S. PATENT DOCUMENTS

| | | | |
|---|---|---|---|
| 7,504,969 | B2 | 3/2009 | Patterson et al. |
| 7,506,317 | B2 | 3/2009 | Liang et al. |
| 7,702,843 | B1 | 4/2010 | Chen et al. |
| 7,814,149 | B1 | 10/2010 | Stringham |
| 7,900,052 | B2 | 3/2011 | Jonas |
| 7,953,706 | B2 | 5/2011 | Prahlad et al. |
| 8,006,043 | B2 | 8/2011 | Agesen |
| 8,095,931 | B1 * | 1/2012 | Chen et al. .................. 718/104 |
| 2010/0241785 | A1 | 9/2010 | Chen et al. |
| 2010/0275193 | A1 | 10/2010 | Hansen |

OTHER PUBLICATIONS

Kloster et al., "A Paravirtualized Approach to Content-Based Page Sharing", Jun. 2007, Department of Computer Science, Aalborg University.

Gupta et al., "Difference Engine: Harnessing Memory Redundancy in Virtual Machines", University of California, San Diego.

Kloster et al., "Determining the use of Interdomain: Shareable Pages using Kernel Introspection", Jan. 2007, Department of Computer Science, Aalborg University.

"Office Action of Chinese Counterpart Application", issued on Feb. 2, 2015, p. 1-p. 6.

* cited by examiner (a)

(b)

(a)

(b)

METHOD FOR SHARING MEMORY OF VIRTUAL MACHINE AND COMPUTER SYSTEM USING THE SAME

CROSS-REFERENCE TO RELATED APPLICATION

This application claims the priority benefits of U.S. provisional application Ser. No. 61/548,697, filed on Oct. 18, 2011 and Taiwan application serial no. 100145074, filed on Dec. 7, 2011. The entirety of each of the above-mentioned patent applications is hereby incorporated by reference herein and made a part of this specification.

BACKGROUND OF THE DISCLOSURE

1. Field of the Disclosure

The disclosure relates to a method for sharing unused memories of virtual machines and a computer system using the same.

2. Description of Related Art

As computer hardware cost decreases and demand for large-scale server increases, virtual machines gradually draw attentions. The virtual machine is an interface used between software and a computer system, which may provide various resources of the computer system to the software for utilization. The software is generally an operating system. Therefore, the operating system can access the resources of the computer system through the virtual machine. However, a plurality of virtual machines can be installed on the computer system, and each of the virtual machines may install a different operating system. For example, the Windows operating system of Microsoft and the Linux operating system can be simultaneously installed in different virtual machines on a same computer system.

On the other hand, when a new operating system is developed, the operating system of different versions can be tested on the computer system, where the operating system of different versions are respectively installed on different virtual machines, and when one of the tested operating systems has an error, none-operation of the entire computer system is avoided. Moreover, as a cloud computing is widely used, mobility of a server becomes more and more important. Since the virtual machine can loose a coupling relationship between the operating system and the computer system, one operating system can be moved to another computer system along with the virtual machine, so as to balance a load of the server.

However, although the computer system can execute a plurality of virtual machines in theory, the number of executable virtual machines is limited, and one of the reasons thereof relates to a memory capacity. The memory capacity configured on the computer system is limited, and if the memory is averagely distributed to the executed virtual machines, the memory capacity used by each virtual machine is probably insufficient. However, theses virtual machines probably use a same program code or data (for example, a kernel program of the Windows operating system), so that the same data is stored in each of the virtual machines. If the same data in the virtual machines is shared, and the virtual machines use only one copy of the program code or data stored in the memory of the computer system, the memory of the computer system can be effectively used. One of the methods for sharing the memory is to calculate a hash value of each memory page in each of the virtual machines according to a hash function, and compare whether the memory pages of the virtual machines have the same hash value. If different virtual machines have the memory pages with the same hash value, theses memory pages are probably stored with the same data, which can be further shared. However, such method has to calculate the hash value of each memory page of each of the virtual machines, which is time consuming. Therefore, how to effectively share the memories in the virtual machines is an important issue to be developed by related practitioners.

SUMMARY OF THE DISCLOSURE

The disclosure is directed to a method for sharing memories of virtual machines, which can quickly share a memory of each of the virtual machines executed on a computer system.

The disclosure is directed to a computer system, which is capable of quickly sharing memories of virtual machines executed on the computer system.

The disclosure provides a method for sharing memories of virtual machines. The method is adapted to a computer system configured to execute at least one virtual machine The method includes following steps. A memory map corresponding to the virtual machines is obtained, where the memory map stores usage states of memory pages of the corresponding virtual machine. Unused memory pages of the virtual machines are marked as first free pages according to the memory map corresponding to the virtual machines. The first free pages of the virtual machines are shared.

According to another aspect, the disclosure provides a computer system for executing at least one virtual machine. The computer system includes a memory unit, a processing unit and a memory control unit. The memory unit includes a plurality of physical memory pages, and the processing unit is coupled to the memory unit. The memory control unit is coupled to the processing unit and the memory unit for obtaining a memory map corresponding to the virtual machines, where the memory map stores usage states of memory pages of the corresponding virtual machine The memory control unit further marks unused memory pages of the virtual machines as first free pages according to the memory map corresponding to the virtual machines, and shares the first free pages of the virtual machines.

According to the above descriptions, the disclosure provides a method for sharing memories of virtual machines and a computer system using the same, by which the unused memory pages in the virtual machines on the computer system are shared. Since it is unnecessary to calculate a hash value of each memory page in the virtual machines, an execution speed is increased.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

First Embodiment

Figure 1:
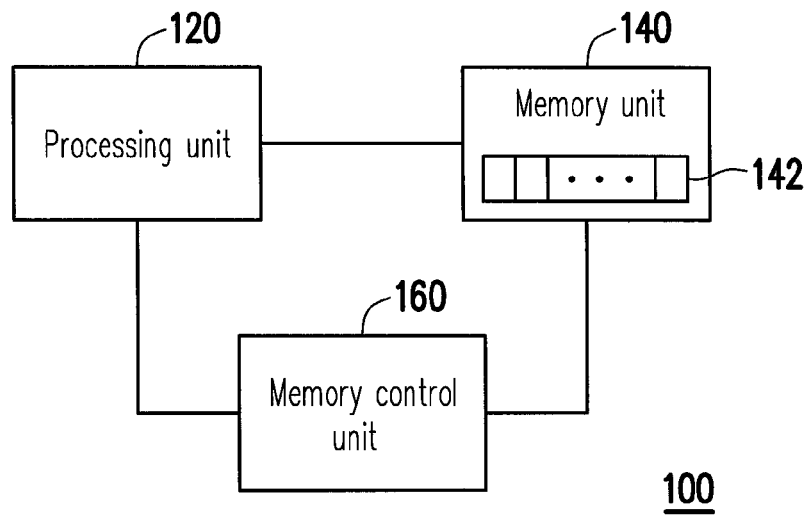
FIG. 1 is a block diagram of a computer system according to a first embodiment of the disclosure.

FIG. 1 is a block diagram of a computer system according to a first embodiment of the disclosure.

Referring to FIG. 1, the computer system 100 includes a processing unit 120, a memory unit 140 and a memory control unit 160.

The processing unit 120 is coupled to the memory unit 140 for executing software and firmware of the computer system 100. The processing unit 120 is, for example, a central processing unit (CPU).

The memory unit 140 includes a plurality of physical memory pages 142. The memory unit 140 is, for example, a dynamic random access memory (DRAM) or a static random access memory (SRAM).

The memory control unit 160 is coupled to the processing unit 120 and the memory unit 140 for controlling the physical memory pages 142 in the memory unit 140. The memory control unit 160 is, for example, a microprocessor, which executes a program code in a non-volatile memory (not shown).

Figure 2:
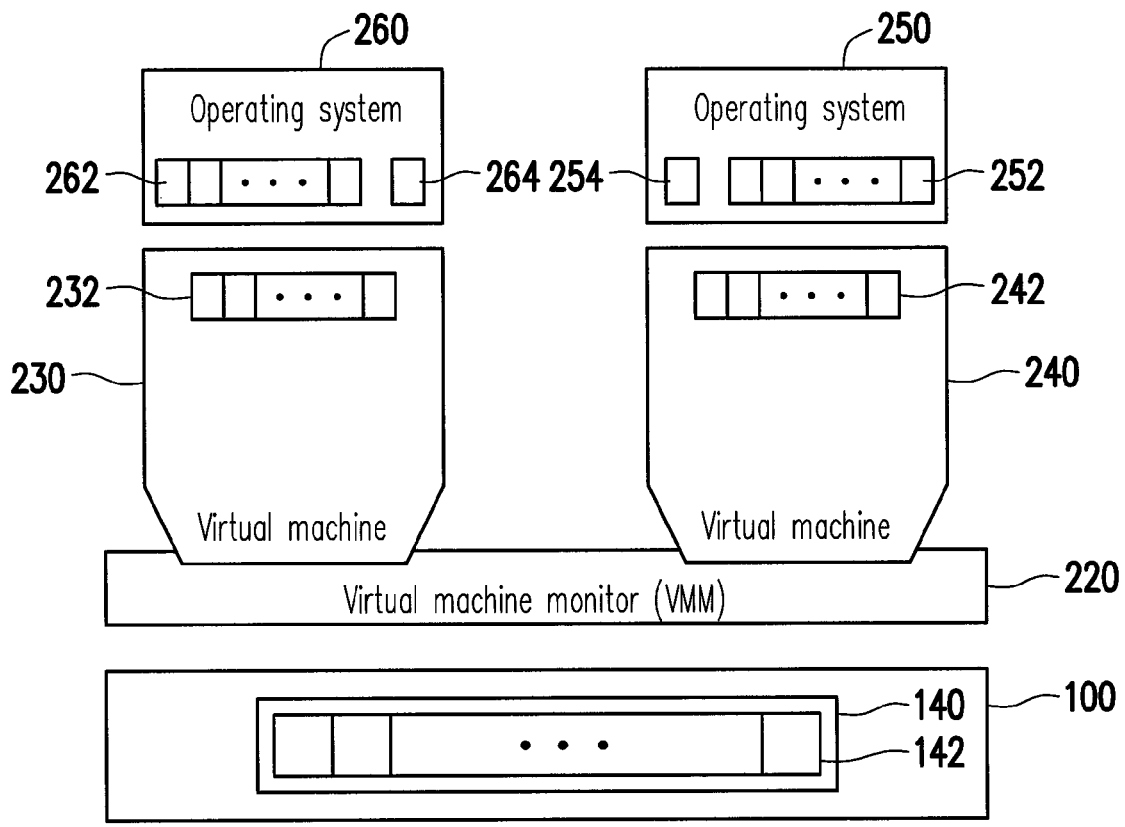
FIG. 2 is a schematic diagram of a computer system and virtual machines according to the first embodiment of the disclosure.

The computer system 100 executes a plurality of virtual machines, and each of the virtual machines executes an operating system. Referring to FIG. 2, FIG. 2 is a schematic diagram of a computer system and virtual machines according to an embodiment of the disclosure. A virtual machine monitor (VMM) 220 is executed on the computer system 100 for controlling all resources of the computer system 100. The resources of the computer system 100 include execution and usage of the processing unit 120, the memory unit 140 and input output (IO) devices (not shown) on the computer system 100. In the present embodiment, the VMM 220 constructs a virtual machine 230 and a virtual machine 240. The virtual machine 230 and the virtual machine 240 can access the aforementioned resources of the computer system 100 through the VMM 220. However, the VMM 220 can provide more or less number of the virtual machines, and the disclosure is not limited to the number of the machines mentioned in the present embodiment.

The VMM 220 can allocate the resources of the computer system 100 to the virtual machine 230 and the virtual machine 240. Taking the memory as an example, the VMM 220 allocates the physical memory pages 142 in the memory unit 140 to the virtual machine 230 and the virtual machine 240, so that the virtual machine 230 includes a plurality of memory pages 232, and the virtual machine 240 includes a plurality of memory pages 242. It should be noticed that the memory pages 232 and the memory pages 242 are guest physical memories, i.e. the memory pages 232 and the memory pages 242 are not physical memories, but are only virtual memories corresponding to the physical memory pages 142 in the memory unit 140.

On the other hand, an operating system 260 is installed on the virtual machine 230, and an operating system 250 is installed on the virtual machine 240. In this way, the operating system 260 can access the resources (for example, the memory pages 232) on the virtual machine 230, and the operating system 250 can access the resources (for example, the memory pages 242) on the virtual machine 240. The operating system 260 also includes a plurality of virtual memory pages 262, and the operating system 260 uses a logical address to access the virtual memory pages 262. When the operating system 260 uses the logical address to access the virtual memory pages 262, the operating system 260 transforms the logical address to a guest physical address of the memory pages 232, and the VMM 220 transforms the guest physical address to a physical address of the physical memory pages 142. The operating system 260 accesses the physical memory pages 142 through the above transformation relationship. The operating system 250 can also use logical addresses to access the physical memory pages 142 through similar transformations, which is not repeated herein.

A memory map 264 in the operating system 260 stores usage states of the memory pages 232. In an embodiment, the operating system 260 is a Windows operating system, and the memory map 264 is a page frame number (PFN) database. The PFN database has a data structure arranged in an array, and each element in the array includes a "type" field, and the "type" field records the usage state of the corresponding memory page 232. The usage states of the memory page 232 are, for example, "configured" or "unused", etc. In an embodiment, the operating system 250 is a Linux operating system, and a buddy system algorithm is used to manage free pages, and the memory map 254 is an array-type data structure named as mem_map. However, the type of the operating system executed on the virtual machine and the data structure of the memory map are not limited by the disclosure.

Figure 3:
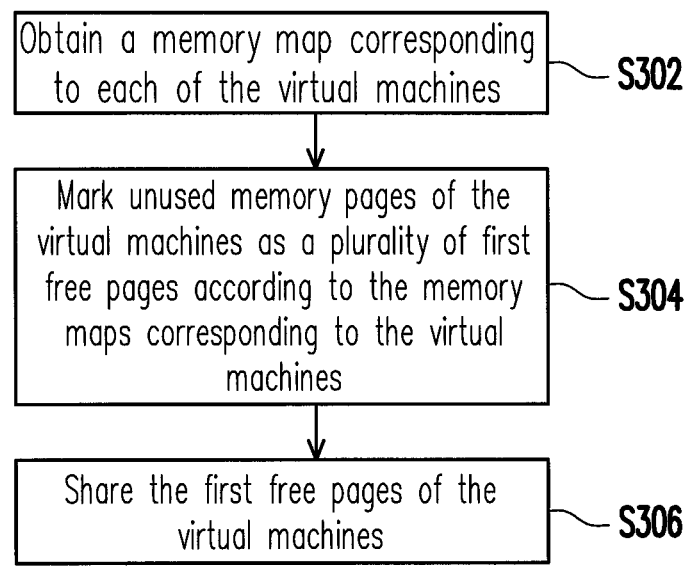
FIG. 3 is a flowchart illustrating a method for sharing memories of virtual machines according to the first embodiment of the disclosure.

FIG. 3 is a flowchart illustrating a method for sharing memories of virtual machines according to an embodiment of the disclosure.

Referring to FIG. 3, in step S302, the memory control unit 160 of the present embodiment obtains an address of the memory map corresponding to each of the virtual machines in the memory, and obtains the memory map according to the address. In detail, the memory control unit 160 obtains the memory map 264 corresponding to the virtual machine 230 and the memory map 254 corresponding to the virtual machine 240. In an embodiment, the operating system 260 is the Windows operating system, and in the Windows operating system, execution files, dynamically linked libraries (DLLs) or a kernel image file are all complied with a portable executable (PE) format. The memory control unit 160 can find a base address of the kernel image file in the memory according to the kernel image file having the PE format, and find a corresponding program database (PDB) file. The memory control unit 160 can find a relative address of the memory map 264 in the memory of the operating system 260 relative to the kernel image file from the PDB file. The memory control unit 160 combines the relative address and the base address to obtain the memory address of the memory map 264. However, the method that the memory control unit 160 obtains the memory map is not limited by the disclosure.

Figure 4A:
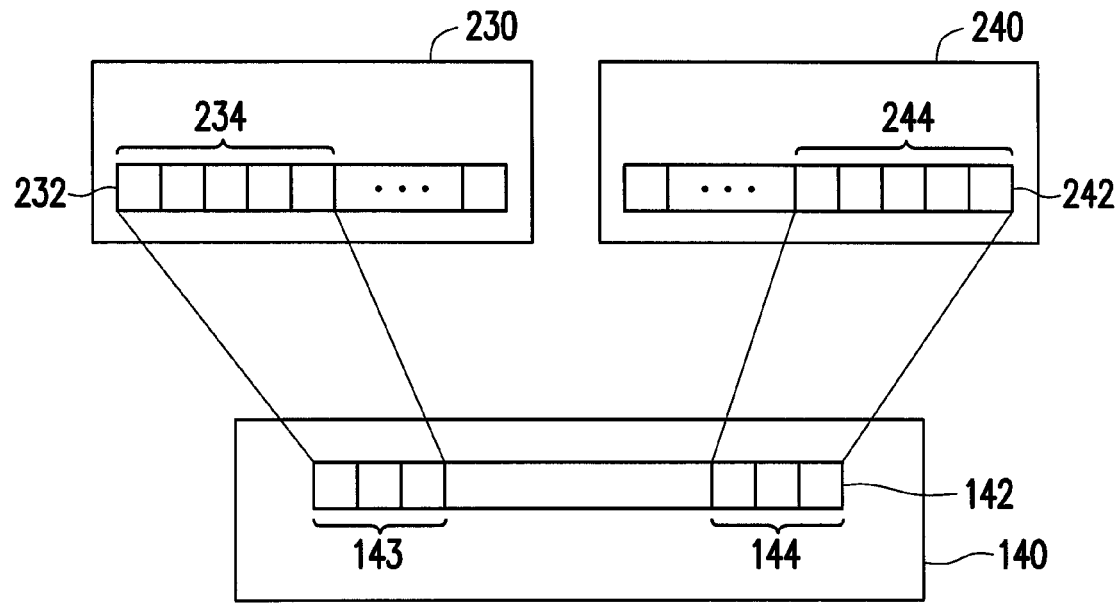
FIG. 4A is a schematic diagram of a first free page according to the first embodiment of the disclosure.
Figure 4A:
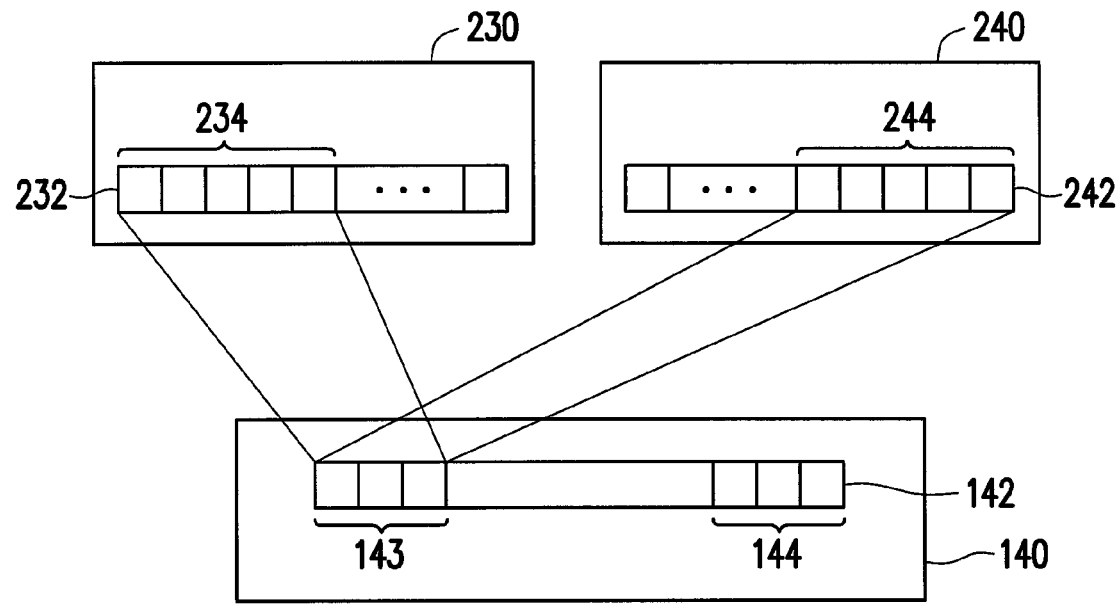

In the step S304, the memory control unit 160 marks unused memory pages of the virtual machines as a plurality of first free pages according to the memory maps corresponding to the virtual machines Referring to FIG. 4A(a), FIG. 4A is a schematic diagram of the first free page according to an embodiment of the disclosure. For example, the memory control unit 160 obtains the usage states of the memory pages 232 according to the memory map 264, and marks the memory pages with the usage state of "unused" as the first free pages 234. The memory control unit 160 obtains the usage states of the memory pages 242 according to the memory map 254, and marks the unused memory pages in the virtual machine 240 as the first free pages 244. The first free pages refer to the memory pages marked as the first free pages. It should be noticed that the first free pages 234 correspond to physical memory pages 143 in the memory unit 140, and the first free pages 244 correspond to physical memory pages 144 in the memory unit 140. Therefore, the first free pages 234 and the first free page 244 respectively occupy different physical memory pages of the memory unit 140. It should be noticed that if data in the first free pages 234 and the first free pages 244 are not reset (i.e. are set to 0), after operations of a hash function, the first free pages 234 and the first free pages 244 probably generate different hash values, and cannot be shared according the conventional method.

In step S306, the memory control unit 160 shares the first free pages of the virtual machines. For example, the memory control unit 160 shares the first free pages 234 and the first free pages 244, and the first free pages 234 and the first free pages 244 are corresponded to the same physical memory pages 143 (shown in FIG. 4A(b)). In an embodiment, the VMM 220 is a virtual machine monitor named Xen with opened source codes, which provides a nominate command and a share command to share the memories. The memory control unit 160 can call the nominate command and the share command to share the memories. On the other hand, in another embodiment, the function executed by the memory control unit 160 is implemented as program codes on the virtual machine 230, and the processing unit 120 executes and calls the nominate command and the share command to share the memories. The method of sharing the memories on the virtual machines is not limited by the disclosure.

In other embodiments, in order to avoid a situation that the virtual machine 230 (or the virtual machine 240) write data into the first free pages 234 (or the first free pages 244) while the memory control unit 160 shares the first free pages 234 and the first free pages 244, where such situation may lead to a fact that the memory control unit 160 shares the used memory pages to cause an error, in an embodiment of the disclosure, the memory control unit 160 pauses the virtual machines to access the first free pages in the step S304, and after the step S306, the memory control unit 160 resumes the virtual machines to access the first free pages.

Figure 4B:
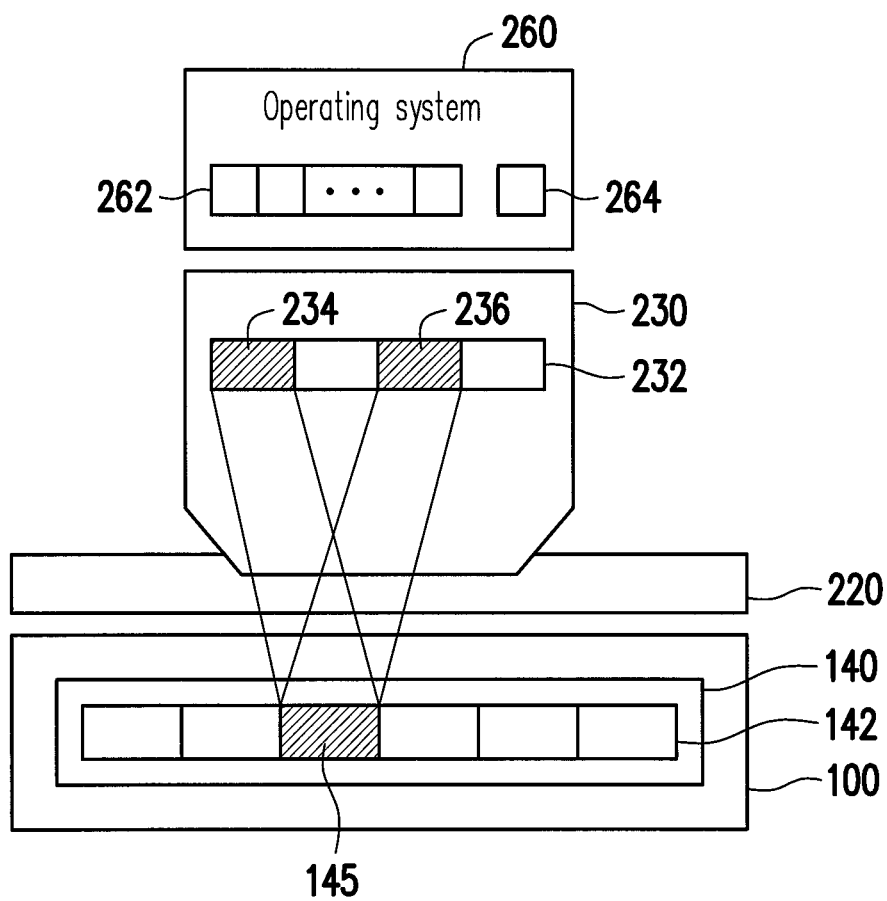
FIG. 4B is a schematic diagram of sharing memory pages of one virtual machine according to the first embodiment of the disclosure.

However, the number of the virtual machines sharing the memory pages is not limited by the disclosure, and the disclosure is also suitable for a computer system with only one virtual machine executed thereon. FIG. 4B is a schematic diagram of sharing memory pages of one virtual machine according to an embodiment of the disclosure.

Referring to FIG. 4B, in an embodiment, only one virtual machine 230 is constructed on the VMM 220, and the operating system 260 is executed on the virtual machine 230. According to the flow of FIG. 3, the memory control unit 160 first obtains the memory map 264 on the virtual machine 230 (the step S302). Then, in the step S304, the memory control unit 160 marks the unused memory pages 232 on the virtual machine 230 as the first free pages according to the memory map 264 corresponding to the virtual machine 230. For example, the memory control unit 160 marks the unused memory pages 234 and the memory page 236 as the first free pages. Then, in the step S306, the first free pages of the virtual machine 230 are shared, and different memory pages in the memory page 232 can be mapped to a same physical memory page in the physical memory pages 142. For example, after the memory control unit 160 shares the memory page 234 and the memory page 236, the memory page 234 and the memory page 236 are mapped to a physical memory page 145.

Second Embodiment

Figure 5:
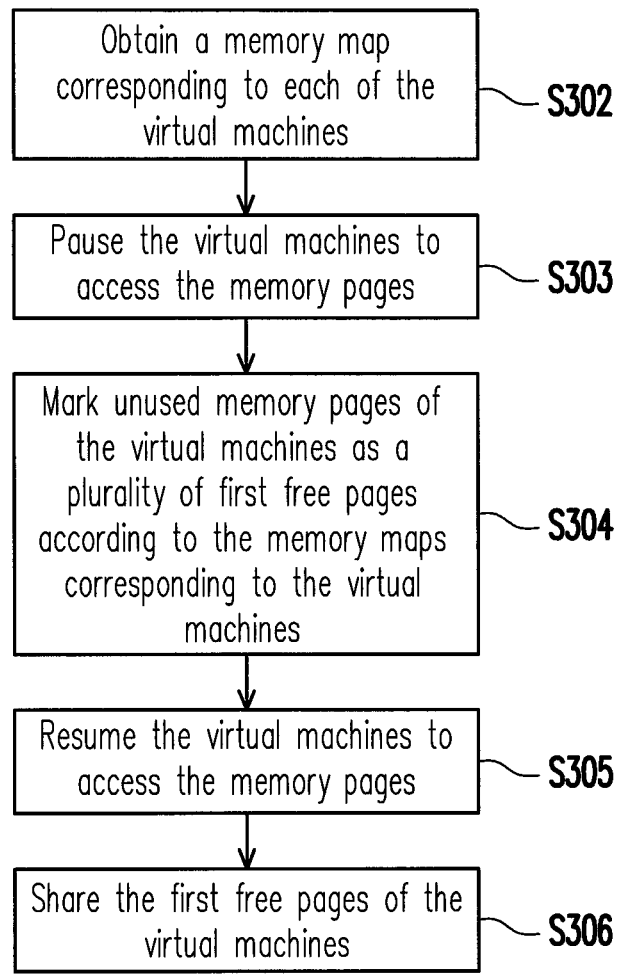
FIG. 5 is a flowchart illustrating a method for sharing memories according a second embodiment of the disclosure.

Referring to FIG. 5, FIG. 5 is a flowchart illustrating a method for sharing memories according a second embodiment of the disclosure, in which the steps S302, S304 and S306 have been described in detail, so that descriptions thereof are not repeated.

In step S303, the memory control unit 160 pauses the virtual machines to access the memory pages. Namely, the memory control unit 160 pauses the virtual machine 230 to access the memory pages 232, and pauses the virtual machine 240 to access the memory pages 242.

Moreover, in step S305, the memory control unit 160 resumes the virtual machines to access the memory pages. Namely, the memory control unit 160 resumes the virtual machine 230 to access the memory pages 232, and resumes the virtual machine 240 to access the memory pages 242.

In this way, an error caused by the situation that the virtual machine writes data into the memory pages while the memory control unit 160 performs the step S304 is avoided.

Third Embodiment

Figure 6:
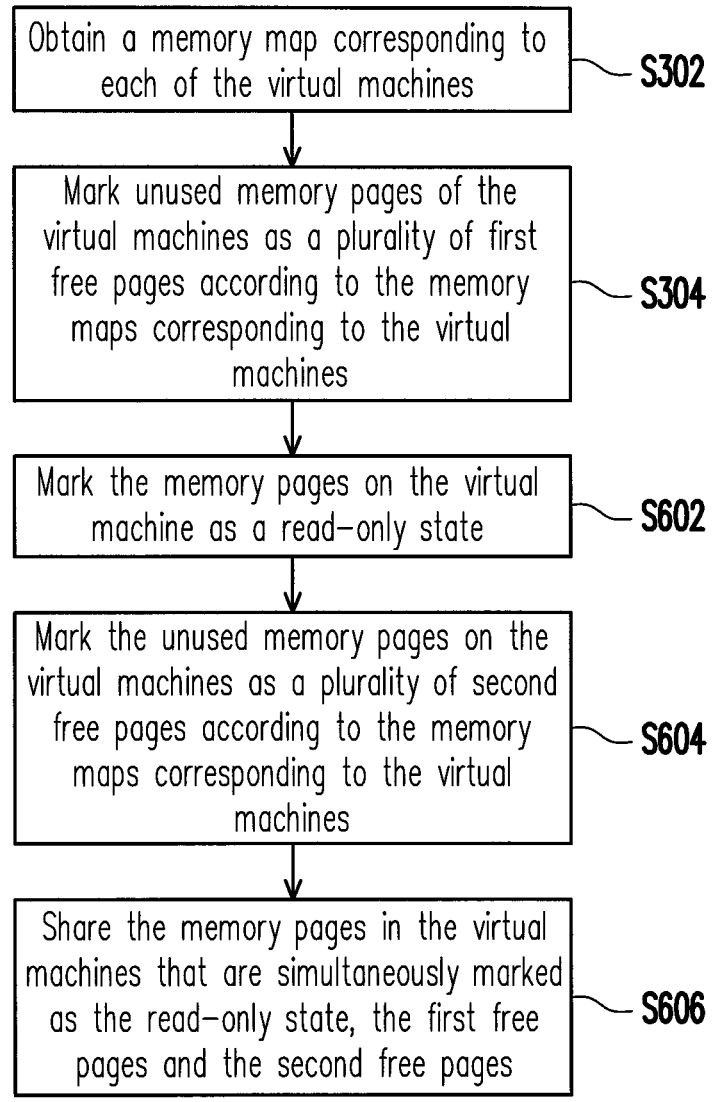
FIG. 6 is a flowchart illustrating a method for sharing memories according to a third embodiment of the disclosure.
Figure 7:
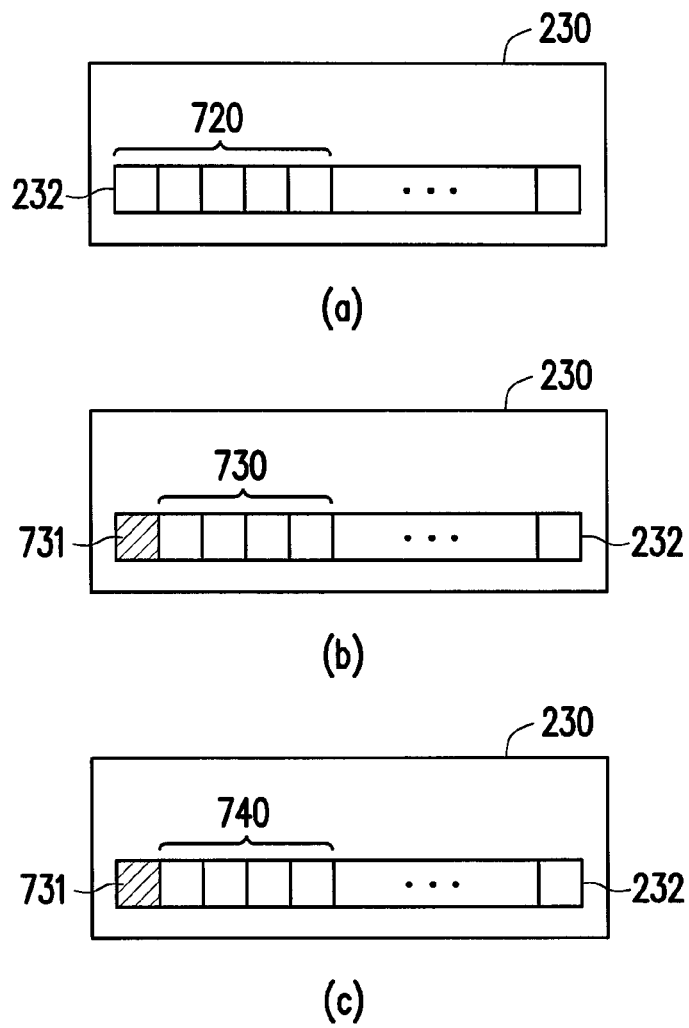
FIG. 7 is a schematic diagram of unused memory pages according to the third embodiment of the disclosure.

Referring to FIG. 6 and FIG. 7, FIG. 6 is a flowchart illustrating a method for sharing memories according to a third embodiment of the disclosure, and FIG. 7 is a schematic diagram of unused memory pages according to the third embodiment of the disclosure. The steps S302 and S304 of FIG. 6 have been described in detail, so that descriptions thereof are not repeated. However, in order to avoid a situation that data is written into the memory pages to be shared after the step S304 and before the memory control unit 160 shares the memory pages, in the present embodiment, the unused memory pages are again marked as second free pages according to the memory map, and a read-only mark is used to confirm that the memory pages are not written with data.

For example, in the step S304, the memory control unit 160 marks the unused memory pages on the virtual machines as a plurality of first free pages 720 (shown in FIG. 7(a)) according to the memory map 264 corresponding to the virtual machine 230.

Then, in step S602, the memory control unit 160 marks the memory pages on the virtual machine as a read-only state. In detail, the memory control unit 160 marks the memory pages marked as the first free pages as the read-only state. Taking the virtual machine 230 as an example, the first free pages 720 are all marked as the read-only state by the memory control unit 160. Besides, after the step S602, if a memory page (for example, the first free page 720) marked as the read-only state is written, the memory control unit 160 cancels the read-only state of the written memory page.

Then, in step S604, the memory control unit 160 marks the unused memory pages on the virtual machines as the second free pages according to the memory maps corresponding to the virtual machines. For example, the memory control unit 160 marks the unused memory pages in the memory pages 232 as second free pages 730 (shown in FIG. 7(b)) according to the memory map 264 corresponding to the virtual machine 230. It should be noticed that during a period when the memory control unit 160 executes the step S304 and the step S604, a memory page 731 is rewritten, so that ranges of the second free pages 730 and the first free pages 720 are different. Moreover, the read-only state of the memory page 731 is cancelled.

Then, in step S606, the memory control unit 160 shares the memory pages in the virtual machines that are simultaneously marked as the read-only state, the first free pages and the second free pages. For example, the memory control unit 160 checks the memory pages included in the first free pages 720 and the second free pages 730 to obtain repeated memory pages 740 (shown in FIG. 7(C)). When the memory pages are shared, the memory control unit 160 checks whether the memory pages 740 are still in the read-only state to determine whether data is written into the memory pages 740. If the memory pages 740 are still in the read-only state, the memory control unit 160 maintains the read-only state of the memory pages 740 and shares the memory pages 740.

In the present embodiment, the VMM 220 is a virtual machine monitor named Xen with opened source codes, which provides a nominate command and a share command to share the memories. In detail, the memory control unit 160 first calls the nominate command to obtain handles of the memory pages. Then, the memory control unit 160 calls the share command according to the handle of two memory pages, so as to share the two memory pages (the step S606). Namely, the step S606 is implemented by calling the share command, and the nominate command is used to implement the step S602. For example, referring to FIG. 4A, the memory control unit 160 first calls the nominate command to obtain the handles of the memory pages marked as the first free pages 234, and then calls the nominate command to obtain the handles of the memory pages in the virtual machine 240 that are marked as the first free pages 244. Then, the memory control unit 160 calls the share command according to the handles of the memory pages marked as the first free pages 234 and the handles of the memory pages marked as the first free pages 244, so that the memory pages of the first free pages 234 and the first free pages 244 can share the physical memory pages 143. Since the nominate command and the share command are not simultaneously executed, a problem of data writing between the nominate command and the share command is generated.

Figure 8:
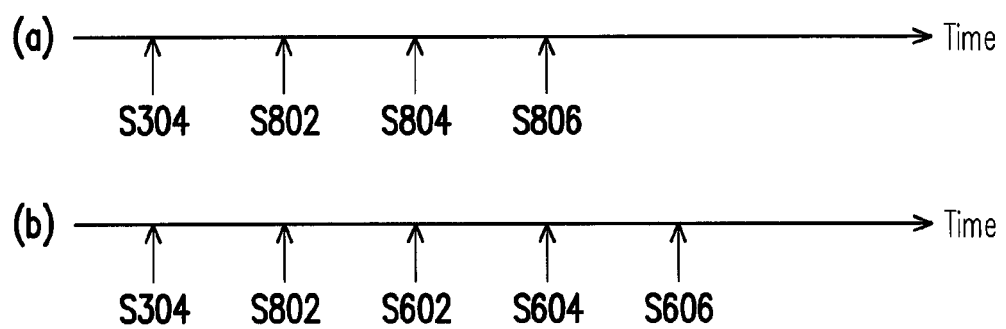
FIG. 8 is a time axis schematic diagram of various steps of a method for sharing memories according to the third embodiment of the disclosure.
Figure 9:
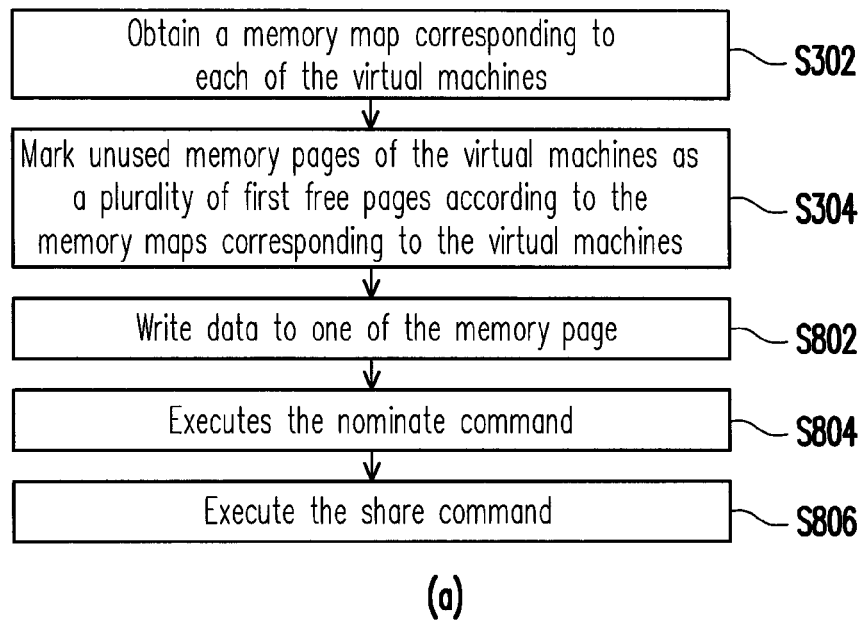
FIG. 9 shows flowcharts respectively illustrating a method for sharing memories according to the third embodiment of the disclosure.
Figure 9:
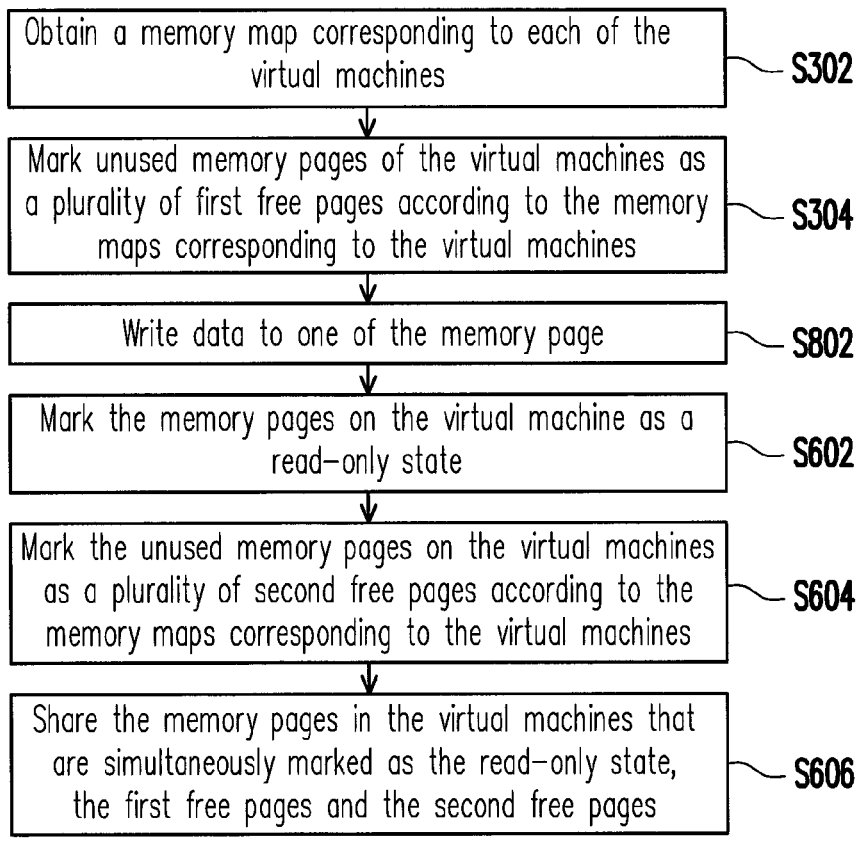

Referring to FIG. 8 and FIG. 9, FIG. 8 is a time axis schematic diagram of various steps of the method for sharing memories according to the third embodiment of the disclosure, and FIG. 9 shows flowcharts respectively illustrating a method for sharing memories according to the third embodiment of the disclosure. FIG. 7 to FIG. 9 are referred for descriptions.

As shown in FIG. 8(a) and FIG. 9(a), the memory control unit 160 first executes the step S304 and marks the unused memory pages as the first free pages 720, and then the virtual machine 230 write data to the memory page 731 (step S802). Then, in step S804, the memory control unit 160 executes the nominate command, though the obtained handles corresponds to the memory pages marked as the first free pages 720. Namely, the first free pages 720 corresponding to the handles obtained by the memory control unit 160 include the used memory page 731. In this case, when the memory control unit 160 executes the share command (step S806), the used memory page 731 is shared, which may cause an error.

However, in the method for sharing memories of the present embodiment, the unused memory pages are confirmed by twice and the read-only mark is used. As shown in FIG. 8(b) and FIG. 9(b), the memory control unit 160 sequentially executes the steps S304 and S802. After the steps S802, the memory control unit 160 marks the memory pages 232 as the read-only state (the step S602), and then the secondary confirmation is performed (the step S604), by which the unused memory pages are marked as the second free pages 730. In this way, the second free pages 730 are obtained in the step S604, and the used memory page 731 is not included. Therefore, in the step S606, the memory control unit 160 executes the share command to share the memory pages 740 that are simultaneously marked as the read-only state, the first free pages and the second free pages without sharing the used memory page 731.

In other embodiments, in the flowchart of FIG. 6, the memory control unit 160 can only execute the steps S302, S304, S604 and S606. Namely, the memory control unit 160 does not mark the memory pages as the read-only state (the step S602), and in the step S606, the memory control unit 160 shares the memory pages marked as the first free pages and the second free pages.

In summary, the disclosure provides a method for sharing memories of virtual machines and a computer system. In the disclosure, since the shared memories are the unused memory pages in the virtual machines, comparison of hash values is unnecessary, by which system efficiency is improved. On the other hand, when the unused memory pages in the virtual machines are confirmed, the virtual machines are paused to access the memory pages, or the unused memory pages are confirmed by twice, so as to resolve the problem that data is written into the memory pages while the memory pages are shared.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for sharing memories of virtual machines, adapted to a computer system configured to execute at least one virtual machine, wherein the computer system comprises a plurality of physical memory pages, and the method for sharing memories of virtual machines comprising:
   obtaining a memory map corresponding to the at least one virtual machine, wherein the memory map stores usage states of a plurality of guest physical memory pages on the at least one virtual machine, wherein the guest physical memory pages are virtual;
   marking unused memory pages among the guest physical memory pages on the at least one virtual machine as a plurality of first free pages according to the memory map corresponding to the at least one virtual machine;
   marking the guest physical memory pages marked as the first free pages as a read-only state; and
   sharing the first free pages that are marked as the read-only state and the first free pages in the at least one virtual machine with a same one of the physical memory pages, such that at least two of the shared first free pages are mapped to the same one of the physical memory pages.

2. The method for sharing memories of virtual machines as claimed in claim 1, further comprising:
   marking unused memory pages among the guest physical memory on the at least one virtual machine as a plurality of second free pages according to the memory map corresponding to the at least one virtual machine; and sharing the guest physical memory pages in the at least one virtual machine that are marked as the read-only state and the first free pages and marked as the second free pages.

3. The method for sharing memories of virtual machines as claimed in claim 2, wherein a number of the guest physical memory pages marked as the second free pages is less than a number of the guest physical memory pages marked as the first free pages.

4. The method for sharing memories of virtual machines as claimed in claim 1, wherein after the step of marking the guest physical memory pages marked as the first free pages as the read-only state, the method further comprises:
when the guest physical memory pages marked as the read-only state and marked as the first free pages are written, cancelling the read-only state of the written guest physical memory pages.

5. The method for sharing memories of virtual machines as claimed in claim 1, wherein before the step of marking the unused memory pages on the at least one virtual machine as the first free pages according to the memory map corresponding to the at least one virtual machine, the method further comprises:
pausing the at least one virtual machine to access the guest physical memory pages.

6. The method for sharing memories of virtual machines as claimed in claim 5, wherein after the step of marking the unused memory pages on the at least one virtual machine as the first free pages according to the memory map corresponding to the at least one virtual machine, the method further comprises:
resuming the at least one virtual machine to access the guest physical memory pages.

7. The method for sharing memories of virtual machines as claimed in claim 1, wherein before the step of sharing the first free pages in the at least one virtual machine, the method further comprises:
pausing the at least one virtual machine to access the first free pages.

8. The method for sharing memories of virtual machines as claimed in claim 7, wherein after the step of sharing the first free pages in the at least one virtual machine, the method further comprises:
resuming the at least one virtual machine to access the first free pages.

9. A computer system, adapted to execute at least one virtual machine, and the computer system comprising:
a memory unit, comprising a plurality of physical memory pages;
a processing unit, coupled to the memory unit; and
a memory control unit, coupled to the processing unit and the memory unit,
wherein the memory control unit obtains a memory map corresponding to the at least one virtual machine, the memory map stores usage states of a plurality of guest physical memory pages of the corresponding virtual machine, wherein the guest physical memory pages, the memory control unit marks unused memory pages among the guest physical memory pages on the at least one virtual machine as a plurality of first free pages according to the memory map corresponding to the at least one virtual machine, further marks the guest physical memory pages marked as the first free pages as a read-only state, and shares the first free pages that are marked as the read-only state and the first free pages in the at least one virtual machine with a same one of the physical memory pages, such that at least two of the shared first free pages are mapped to the same one of the physical memory pages.

10. The computer system as claimed in claim 9, wherein the memory control unit marks the unused memory pages among the guest physical memory pages on the at least one virtual machine as a plurality of second free pages according to the memory map corresponding to the at least one virtual machine, and shares the guest physical memory pages in the at least one virtual machine that are marked as the read-only state and the first free pages and marked as the second free pages.

11. The computer system as claimed in claim 10, wherein a number of the guest physical memory pages marked as the second free pages is less than a number of the guest physical memory pages marked as the first free pages.

12. The computer system as claimed in claim 9, wherein after the memory control unit marks the guest physical memory pages marked as the first free pages as the read-only state, when the guest physical memory pages marked as the read-only state and marked as the first free pages are written, the memory control unit cancels the read-only state of the written guest physical memory pages.

13. The computer system as claimed in claim 9, wherein before the memory control unit marks the unused memory pages on the at least one virtual machine as the first free pages, the memory control unit pauses the at least one virtual machine to access the guest physical memory pages.

14. The computer system as claimed in claim 13, wherein after the memory control unit marks the unused memory pages on the at least one virtual machine as the first free pages, the memory control unit resumes the at least one virtual machine to access the guest physical memory pages.

15. The computer system as claimed in claim 9, wherein before the memory control unit shares the first free pages in the at least one virtual machine, the memory control unit pauses the at least one virtual machine to access the first free pages.

16. The computer system as claimed in claim 15, wherein after the memory control unit shares the first free pages in the at least one virtual machine, the memory control unit resumes the at least one virtual machine to access the first free pages.

* * * * *